United States Patent
Kinta et al.

(10) Patent No.: US 10,470,477 B2
(45) Date of Patent: Nov. 12, 2019

(54) BAKED CHOCOLATE CONFECTIONERY

(71) Applicant: MORINAGA & CO., LTD., Tokyo (JP)

(72) Inventors: Yasuyoshi Kinta, Yokohama (JP); Naoki Iemoto, Yokohama (JP)

(73) Assignee: MORINAGA & CO., LTD., Tokyo (JP)

( * ) Notice: Subject to any disclaimer, the term of this patent is extended or adjusted under 35 U.S.C. 154(b) by 0 days.

(21) Appl. No.: 14/439,178

(22) PCT Filed: Oct. 31, 2013

(86) PCT No.: PCT/JP2013/079641
§ 371 (c)(1),
(2) Date: Apr. 28, 2015

(87) PCT Pub. No.: WO2014/069607
PCT Pub. Date: May 8, 2014

(65) Prior Publication Data
US 2015/0289535 A1    Oct. 15, 2015

(30) Foreign Application Priority Data
Oct. 31, 2012  (JP) ................... 2012-239832

(51) Int. Cl.
*A23G 1/54*    (2006.01)
*A23G 1/00*    (2006.01)
(Continued)

(52) U.S. Cl.
CPC ............. *A23G 1/54* (2013.01); *A23G 1/00* (2013.01); *A23G 1/30* (2013.01); *A23G 1/50* (2013.01);
(Continued)

(58) Field of Classification Search
CPC .......... A23G 1/00; A23G 1/30; A23G 7/0043; A23G 1/54; A23G 1/50; A23V 2002/00
(Continued)

(56) References Cited

FOREIGN PATENT DOCUMENTS

JP      04-281156      10/1992
JP      2000-253823 A   9/2000
(Continued)

OTHER PUBLICATIONS

Machine translatios of : JP2000253823A (Pub. Date: Sep. 19, 2000); JP2004254638A (Pub. Date: Sep. 16, 2004); JP2008206458A (Pub. Date: Sep. 11, 2008); JP2010207197A (Pub. Date: Sep. 24, 2010).*

(Continued)

*Primary Examiner* — Subbalakshmi Prakash
(74) *Attorney, Agent, or Firm* — Posz Law Group, PLC

(57) ABSTRACT

A technique for imparting a mild soft texture inherent to chocolate, particularly a melt-like texture, to the inside of a baked chocolate confectionery obtained by baking a surface of a chocolate molded article. In the present invention, the inside of a baked chocolate confectionery obtained by baking a surface of a chocolate molded article comprising a chocolate dough, a surface structure of the baked chocolate confectionery not adhering to the fingers at 40° C., includes a soft portion in which the maximum particle size of solids as measured by a micrometer is 40 μm or less.

13 Claims, 1 Drawing Sheet

(51) Int. Cl.
*A23G 1/30* (2006.01)
*A23G 1/50* (2006.01)
*A23G 7/00* (2006.01)

(52) U.S. Cl.
CPC ........ *A23G 7/0043* (2013.01); *A23V 2002/00* (2013.01)

(58) Field of Classification Search
USPC .................................................. 426/631, 523
See application file for complete search history.

(56) References Cited

FOREIGN PATENT DOCUMENTS

| | | |
|---|---|---|
| JP | 2004-097096 A | 4/2004 |
| JP | 2004-254638 A | 9/2004 |
| JP | 2004-254639 A | 9/2004 |
| JP | 3665168 B2 | 6/2005 |
| JP | 2008-206457 A | 9/2008 |
| JP | 2008-206458 A | 9/2008 |
| JP | 2010-207196 A | 9/2010 |
| JP | 2010-207197 A | 9/2010 |
| JP | 2010-207198 A | 9/2010 |
| JP | 2011-217640 A | 11/2011 |
| JP | 4825702 B2 | 11/2011 |

OTHER PUBLICATIONS

Shoko Shibukawa, "Utilization of far infrared to Cookery", *New Ceramics*, vol. 6, No. 9, pp. 37-40, Publisher: T.I.C. Ltd., Published in Sep. 1993.

Shoko Shibukawa, "Application of far-infrared heating for food processing: Effect of far-infrared light in heating of foods by baking", *The Food Industry*, vol. 12, No. 42, pp. 40-45, Publisher: Kohrin Publishing co., Ltd., Published in Jun. 1999.

Shoko Shibukawa, "Effect of far-infrared light heating in flour products roasting", *Annual Report*, pp. 107-111, Publisher: The Iijima Foundation for Food Science and Technology, Published in 1993.

PCT International Search Report with English translation for PCT/JP2013/079641, dated Jan. 21, 2014, 5 pages.

* cited by examiner

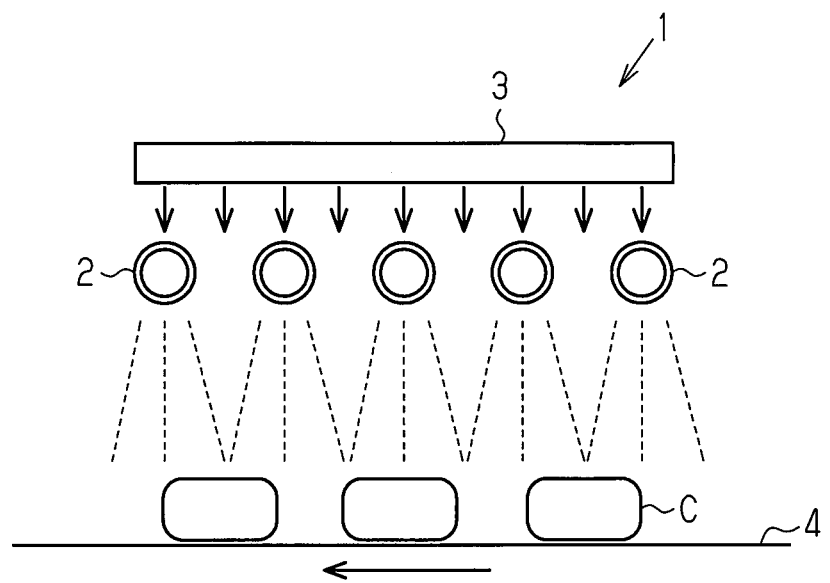

BAKED CHOCOLATE CONFECTIONERY

RELATED APPLICATIONS

The present application is a National Phase entry of PCT Application No. PCT/JP2013/079641, filed Oct. 31, 2013, which application claims priority to Japanese Patent Application No. 2012-239832, filed Oct. 31, 2012, both of said applications being hereby incorporated by reference in their entirety.

FIELD OF THE INVENTION

The present invention relates to a baked chocolate confection obtained by baking the surface layer of a chocolate mold. The present invention also relates to a process for producing the baked chocolate confection.

BACKGROUND OF THE INVENTION

A baked chocolate confection is produced by baking the surface layer of a chocolate, and is characterized by having crispy texture when put into the mouth and a fragrant flavor despite being chocolate.

As such a baked chocolate confection, Patent Document 1 describes a baked chocolate confection obtainable by molding normal temperature-hardening chocolate dough into a predetermined shape and baking the chocolate mold. The chocolate dough contains a polyglyceryl unsaturated fatty acid ester the degree of polymerization of glycerol of which is 2 to 3. In addition, the document describes that a baked chocolate confection is obtained the inside of which maintains soft and smooth texture unique to chocolate because of contained polyglyceryl unsaturated fatty acid ester of which the degree of polymerization of glycerol is 2 to 3, even after being baked.

In addition, Patent Document 2 describes a method for producing a baked confection in which chocolate dough is allowed to contain bubbles to make specific gravity thereof from 0.7 to 1.1, then molded and baked to be solidified. In addition, the document also describes that the baking is carried out at 200° C. to 270° C. for 1 to 10 minutes.

Patent Document 3 describes an aerated chocolate having an average diameter of air cells of 10 to 100 µm and a specific gravity of 0.3 to 0.7.

In addition, Patent Document 4 describes a baked chocolate that contains trehalose and/or maltose and is produced by baking.

These documents describe that chocolate is baked using a Schwank burner.

PRIOR ART DOCUMENTS

Patent Document 1: Japanese Patent No. 4825702
Patent Document 2: Japanese Patent No. 3665168
Patent Document 3: Japanese Laid-Open Patent Publication No. 2010-207196
Patent Document 4: Japanese Laid-Open Patent Publication No. 2010-207197

SUMMARY OF THE INVENTION

Since the surface layer of the chocolate has been sufficiently baked to be hardened in a baked chocolate confection, the baked chocolate confection can be picked up with fingers and easily brought to the mouth while the shape thereof remaining as it is. In addition, since the surface layer of the chocolate has been sufficiently baked, crispy texture at first bite and a fragrant flavor are obtained.

The conventional baked chocolate confection, however, has had a problem that although the surface layer of the chocolate mold has been sufficiently baked, thermal denaturation occurs also from the surface layer to the central portion of the chocolate mold during the baking, thereby deteriorating softness, smoothness and a moist feel unique to chocolate inside the confection.

Use of a specific emulsifier, use of a specific saccharide, or aeration has been employed as methods for solving such a problem as described in Patent Documents 1 to 4.

Any of those techniques, however, has not been satisfactory, for example, to accomplish melting softness inside the confection.

In addition, the polyglyceryl unsaturated fatty acid ester described in Patent Document 1 is good enough in terms of a flavor.

In the situation described above, there have been demands for a means for making the inside have moist, soft and particularly melted texture unique to chocolate, while accomplishing the texture of the surface layer and the moldability as a whole as baked chocolate confection. More specifically, there have been demands for a means to accomplish a gap between the crispy texture of the surface layer by baking and the moist and soft texture of the inside.

That is, the objective of the present invention is to provide a technique for making, in a baked chocolate confection obtained by baking the surface layer of a chocolate mold, the inside thereof have a moist, soft, and particularly melted texture unique to chocolate.

In other words, the objective of the present invention is to provide a product, or a baked chocolate confection, that is obtained by baking the surface layer of a chocolate mold formed of chocolate dough to have moist, soft, and particularly melted texture of the inside unique to chocolate, while having crispy texture, a fragrant flavor, and moldability of the surface layer, which are unique to the baked chocolate confection.

To achieve the foregoing objective, the present invention provides a baked chocolate confection that is obtainable by baking a surface layer of a chocolate mold formed of chocolate dough and has a surface structure that does not transfer to fingers at 40° C. The baked chocolate confection has an inside including a soft portion of solids having a maximum particle size of 40 µm or less as measured by a micrometer at 40° C.

The baked chocolate confection satisfying the conditions described above has an exceedingly soft inside while possessing surface hardness required as a baked chocolate that can be eaten with the hand, thereby being able to provide considerable feeling of the texture gap between the surface and the inside when eaten.

In the conventional baked chocolate confection, the heat transferred to the inside of the confection upon baking agglomerates the solids contained in the chocolate dough inside the confection, thereby making the maximum particle size of the solids in the structure inside the confection larger than 40 µm.

In a preferred form of the present invention, when 0.3 g of a structure piece from the soft portion is allowed to stand within a circle with a diameter of 15 mm on a plastic plate at 40° C. and then the plate is stood upright, the structure piece is deformed while sticking to the plate.

When the inside of the confection has such a physical property, texture as if the chocolate inside the confection melted and came out can be obtained at the moment when the surface is bitten.

This provides the considerable feeling of the texture gap between the surface and the inside when the confection is eaten.

In a preferred form of the present invention, the chocolate dough contains neither cocoa mass nor cocoa powder.

When chocolate dough does not contain cocoa mass or cocoa powder, for example, in the case of a white chocolate, the texture of the inside of the confection is typically deteriorated easily by the baking. Even in such a case, the chocolate confection according to the present invention having the characteristics described above provides satisfactory texture of the inside.

The present invention also provides a baked chocolate confection that is obtainable by baking a surface layer of a chocolate mold formed of chocolate dough and has a surface structure that does not transfer to the fingers at 40° C. The baked chocolate confection has an inside including a soft portion. When 0.3 g of a structure piece from the soft portion is allowed to stand within a circle with a diameter of 15 mm on a plastic plate at 40° C. and then the plate is stood upright, the structure piece is deformed while sticking to the plate.

The baked chocolate confection, which satisfies the conditions described above, has texture as if the chocolate inside the confection melted and came out upon biting, while possessing surface hardness required as a baked chocolate that can be eaten with a hand.

This provides considerable feeling of the texture gap between the surface and the inside when eaten.

In a preferred form of the present invention, the volume of the soft portion is 5% by volume or more of the baked chocolate confection.

Such a baked chocolate confection has texture as if the chocolate inside the confection melted and came out at the moment of biting, and thus has high palatability.

It is required to selectively bake the surface layer in order to produce the baked chocolate confection described above, and for this purpose, the baking needs to be performed at high temperature and in a short period of time. A method for producing the above described baked chocolate confection is provided. The method is characterized by baking the surface layer of the chocolate mold formed of chocolate dough by heat emission using an electric heater.

Although a Schwank provides a high temperature due to the use of a flame by gas combustion, the emission wavelength distribution inclines to the short wavelength side due to the Planck distribution. When the selective baking of the surface layer is intended, it is preferred to use a far-infrared region, which is on the long wavelength side, and in this respect, it is preferred to use an electric heater, which is readily temperature-controlled.

In this way, only the surface layer of the chocolate can be efficiently baked to be hardened.

In a preferred form of the present invention, the surface temperature of the electric heater is from 250° C. to 800° C. and the baking time is from 0.5 to 45 seconds.

When baking of the chocolate mold is performed at such a baking temperature and for such a baking time, the baked chocolate having the physical properties described above is readily produced.

In a preferred form of the present invention, the is characterized by baking the surface layer of the chocolate mold further by blowing hot air onto the surface of the chocolate mold.

Use of the hot air increases the heat transfer efficiency and shortens the baking time, thereby making it possible to further readily produce the baked chocolate having the physical properties described above. However, for example, in the case of a chocolate mold having an angulated shape, an excessively high wind velocity causes scorch only at the angulated parts, thereby being unsuitable.

In a preferred form of the present invention, the method is characterized in that the electric heater includes a plurality of pipes arranged with a distance therebetween and delivers hot air through between the pipes.

This configuration makes it possible to more efficiently bake only the surface layer of the chocolate mold, thereby being able to further readily produce the baked chocolate having the physical properties described above.

In a preferred form of the present invention, the method is characterized in that the hot air has a temperature from 150 to 600° C. and an air velocity of 5 m/s or less on reaching the surface of the chocolate confection.

Even in the case of the chocolate mold having an angulated shape, this configuration makes it possible to bake only the surface layer of the chocolate mold without causing scorch only at the angulated parts, thereby being able to further readily produce the baked chocolate having the physical properties described above.

Further, the present invention provides a method for producing a baked chocolate confection obtainable by baking a surface layer of a chocolate mold formed of chocolate dough. The method includes baking the surface layer of the chocolate mold formed of chocolate dough using an electric heater having a surface temperature from 250 to 800° C. for 0.5 to 45 seconds.

This producing method readily produces a baked chocolate confection with an exceedingly soft inside while having surface hardness required as a baked chocolate that can be eaten with a hand. The produced confection thus provides the considerable feeling of the texture gap between the surface and the inside when eaten.

The preferred embodiments of the producing method are as described above.

The present invention provides a baked chocolate confection the inside of which has moist, soft, and particularly melted texture unique to chocolate in spite of a sufficiently baked surface layer.

BRIEF DESCRIPTION OF THE DRAWINGS

FIG. 1 is a schematic diagram showing a baking apparatus for baking chocolate molds.

DETAILED DESCRIPTION OF THE DRAWINGS

Hereinafter, a baked chocolate confection and a method for producing the same according to the present invention will be described.

In the present invention, chocolate does not refer to that limited by rules or legal regulations, but refers to the whole range of processed oil and fat foods using cocoa mass, cocoa powder, cocoa butter, cocoa butter substitute fat, or the like. In addition, it is possible to use, as chocolate dough, pure chocolate dough, quasi chocolate dough, milk chocolate dough, quasi milk chocolate dough, pure milk chocolate dough, white chocolate dough, or other commonly used chocolate dough.

The present invention may be applied to chocolate dough not containing cocoa mass or cocoa powder, and such an application is preferred.

When chocolate dough does not contain cocoa mass or cocoa powder, for example, in the case of a white chocolate, the texture of the inside of the confection is typically deteriorated easily by baking, but the chocolate confection according to the present invention having the characteristics described above provides texture of the inside satisfactory enough even in such a case.

Such chocolate dough may be prepared using cocoa mass and/or cocoa powder, a saccharide, powdered milk, an emulsifier, cocoa butter and/or cocoa butter substitute fat, a flavoring and the like, which are used for common chocolates, as the main ingredients.

As the saccharide, there may be preferably used, for example, that composed of sugar and other saccharide such as trehalose, sugar alcohol or the like blended with sugar as necessary. The saccharide, however, preferably contains no reducing sugar such as lactose in order to obtain the soft and smooth texture unique to chocolate.

As the powdered milk, there may be used, for example, whole milk powder or skimmed milk powder.

As the cocoa butter and/or the cocoa butter substitute fat, there may be used non-tempering type oil and fat such as hard butter made from coconut oil, palm oil or palm kernel oil or trans-type hard butter having elaidic acid as a constituent fatty acid, or tempering type oil and fat such as cocoa butter.

The chocolate dough used in the present invention may be prepared by mixing the ingredients described above, performing refining, and then carrying out conching according to the conventional techniques. In addition, after the conching, the dough may be subjected to a so-called whipping treatment, where the dough is vigorously stirred while being heated, cooled, pressurized, and depressurized, thereby being allowed to contain bubbles. The stirring may be carried out using, for example, a mixer or an aeration mixer apparatus.

Preferably, the particle size of the solids contained in the chocolate dough thus prepared is from 12 to 30 μm, and more preferably from 12 to 18 μm.

In the present invention, the particle size of the solids is a value measured using a micrometer. As the micrometer, DIGIMATIC MICROMETER (trade name, manufactured by Mitutoyo Corporation) may be used.

The chocolate dough may contain a filling such as crushed nuts, fruit juice powder, freeze-dried fruit chips, coffee chips, caramel candy, powdered green tea, cocoa nibs, a puffed snack food, biscuits chips, candy chips, chocolate chips, dried fruit, or marshmallow.

The chocolate dough thus prepared is molded into a predetermined shape by, for example, molding, where the chocolate dough is charged into molds, extrusion molding, where the chocolate dough is extruded in a predetermined shape through a extruder die and cut, or steel belt molding, where the chocolate dough is directly dropped on a steel belt or the like to be solidified.

In this case, preferably, the minimum diameter of the molded product is 0.5 cm or more, and more preferably from 1.0 to 2.5 cm in order to maintain the soft and smooth texture of the inside after the baking.

Further, in the present invention, the chocolate mold thus obtained is preferably left for 1 hour or more under an atmosphere of a relative humidity of 50 to 70% and a temperature of 15 to 30° C., preferably in a room that is humidity-controlled and temperature-controlled so that the humidity and the temperature are maintained in the ranges described above, respectively, prior to the baking, and then baked. According to these procedures, the chocolate mold can be further efficiently suppressed from sagging during the baking.

Furthermore, the surface of the chocolate mold may be covered with powdered sugar before being baked, so that the chocolate mold is not sagged by the baking and the texture of the inside becomes soft and smooth after the baking. Preferably, the powdered sugar used has a particle size of 50 mesh pass, and more preferably 100 mesh pass. In this case, preferably, the amount of the imparted powdered sugar is from 1 to 5% by mass in relation to the chocolate dough. In addition, preferably, the melting point of the powdered sugar is 150° C. or below. By this powdered sugar-treatment step, a baked chocolate having a transparent appearance and crisp texture is obtained. The preferred powdered sugar includes, for example, water-containing maltose, water-containing trehalose, and glucose. With such powdered sugar, a coating film made of the molten powdered sugar is formed on the surface of the baked chocolate, thereby being able to more effectively maintaining the soft texture of the inside of the chocolate.

Preferably, the baking of the chocolate mold is carried out by baking the surface layer of the chocolate mold by heat emission.

The baking by heat emission may be carried out using, for example, a radiation type electric heater emitting infrared rays. In this way, only the surface layer of the chocolate is efficiently baked to be hardened.

An example of the case using the electric heater will be illustrated below referring to FIG. 1.

FIG. 1 is a schematic diagram showing a baking apparatus for baking a chocolate mold.

A baking apparatus 1 is provided with an electric heater 2 for baking chocolate molds C by heat emission, a blower 3 delivering hot air toward the chocolate molds C, a conveyer 4 arranged below the electric heater 2 to convey the chocolate molds C in a horizontal direction.

Satisfactory baking could be accomplished without the blower 3.

The electric heater 2 includes a plurality of pipes, which are arranged in parallel at an interval.

By arranging the electric heater pipes with a distance, heat exchange with the hot air from the blower 3 is made effective and the paths of the hot air are made homogeneous.

The electric heater 2 is typically set to a temperature of approximately 250 to 800° C., and preferably approximately 300 to 700° C. upon baking. Furthermore, more preferably, the electric heater 2 is set to a temperature of approximately 400 to 600° C.

The shape of the electric heater 2 may be also plate-like.

Preferably, the distance between the electric heater 2 and the chocolate molds C passing below the electric heater 2 is from 1 to 30 cm, and more preferably from 5 to 15 cm.

The blower 3 delivers the hot air downward. The hot air delivered from the blower 3 passes between the pipes of the electric heater 2 and blows against the surfaces of the chocolate molds below the electric heater 2.

Preferably, the hot air temperature is from 150 to 600° C., and more preferably from 200 to 400° C. at the time when reaching the chocolate molds. Preferably, the wind velocity of the hot air is 5 m/s or less, and more preferably 3 m/s or less at the time when reaching the chocolate molds.

The chocolate molds C are conveyed by the conveyer 4 below the electric heater 2. Preferably, the baking time by the electric heater 2 is from 1 to 30 seconds, and more preferably from 3 to 20 seconds.

When a baking apparatus without the blower 3 is used, the baking time is typically from 0.5 to 45 seconds, preferably from 1 to 45 seconds, more preferably from 5 to 45 seconds, and still more preferably from 10 to 30 seconds.

When the chocolate molds are baked at such a baking temperature and for such a baking time, baked chocolate having the physical properties described above is easily produced.

Preferably, the relationship between the baking temperature and the baking time is the following combinations:

the baking temperature is from 250 to 800° C. and the baking time is from 0.5 to 45 seconds; or the baking temperature is from 300 to 700° C. and the baking time is from 1 to 45 seconds.

In addition, it is also preferred to make the relationship between the baking temperature and the baking time the following combinations:

the baking temperature is from 250 to 500° C., and preferably from 300 to 500° C., and the baking time is from 20 to 45 seconds, and preferably from 25 to 45 seconds; or the baking temperature is from 500 to 800° C., and preferably from 500 to 700° C., and the baking time is from 0.5 to 20 seconds, and preferably from 1 to 15 seconds.

After being baked, the chocolate mold is allowed to cool or forcedly cooled by blowing air, so that the backed chocolate confection according to the present invention is obtained.

The baked chocolate confection according to the present invention thus produced satisfies the following conditions.

(1) The surface structure of the confection does not transfer to fingers at 40° C.

Satisfying this condition means that the surface structure has been hardened to an extent that the confection can be readily picked up with fingers. This condition is generally satisfied by the conventional baked chocolate confection.

It can be determined whether this condition is satisfied according to whether the chocolate dough transfers to fingers when the baked chocolate confection is placed at a temperature of 40° C. and touched with force of a degree similar to that with which confection is typically picked up.

Preferably, the baked chocolate confection has no scorches on the surface. Preferably, the baked chocolate confection is baked evenly on the surface. In addition, preferably, the surface is sufficiently baked.

(2) The inside of the confection includes a soft portion of solids having a maximum particle size of 40 μm or less as measured by a micrometer at 40° C.

When this condition is satisfied, the inside of the baked chocolate confection has soft and moist texture.

As used herein, particle size of the solids refers to the maximum particle size.

As used herein, solids refer to those in the components forming the continuous chocolate dough. That is, the solids refer to cocoa mass, cocoa powder, oil and fat, protein, saccharides and the like. On the other hand, the solids as described herein do not include the auxiliary materials such as nuts, dried fruit and puffs, which are contained discontinuously.

The particle size of the solids is measured using the softest central portion in the inside of the baked chocolate confection as a sample with a micrometer at a temperature of 40° C. As the micrometer, DIGIMATIC MICROMETER (trade name, manufactured by Mitutoyo Corporation) may be used. Then, it can be determined whether this condition is satisfied depending on the maximum particle size of the solid of either 40 μm or less or more than 40 μm.

As indicated in Examples described below, in the conventional baked chocolate confection, the maximum particle size of the solids contained in the softest structure of the central portion is more than 40 μm. In such baked chocolate confection, the inside, though is smooth, hardly has melted texture, thereby having no sufficient texture gap between the inside and the outer layer.

On the other hand, since the baked chocolate confection according to the present invention includes a soft portion satisfying this condition, the inside of the baked chocolate confection has melted texture, thereby having a sufficient texture gap between the outer layer.

Preferably, in the baked chocolate confection according to the present invention, the maximum particle size of the solids in the soft portion of the inside is 40 μm or less, and more preferably 30 μm or less.

Preferably, the baked chocolate confection according to the present invention satisfies a condition (3) described below in addition to or in place of the condition (2) described above. Preferably, this condition is particularly applied in the cases using chocolate dough containing cocoa powder or cocoa mass.

(3) There is included a soft portion such that allowing 0.3 g of a structure piece to stand within a circle with a diameter of 15 mm on a plastic (polycarbonate) plate at 40° C., and when the plate is stood upright, the structure piece is deformed while sticking to the plate.

When this condition is satisfied, the inside of the baked chocolate confection has sufficiently soft and moist texture. In addition, there is obtained texture as if the chocolate inside the confection melted and came out at the moment when chewing the surface.

Whether this condition is satisfied is determined as follows. The softest central portion of the baked chocolate is used as a sample and allowed to stand in a state of a generally spherical shape on a plastic (polycarbonate) plate. The sample, in an amount of approximately 0.3 g, is allowed to stand within a circle with a diameter of 15 mm. Subsequently, the plate is stood upright at a temperature of 40° C. and allowed to stand for a predetermined period of time, e.g., approximately 60 minutes, then determination is performed according to whether the sample is deformed while sticking to the plate or not. As used herein, deformation refers to that large enough to be visually recognizable.

The cases not satisfying the condition described above include that where the sample drops from the plate, that where the sample sticks to the plate while maintaining the generally spherical shape, and the like.

The soft portion described above may be present anywhere inside the confection, and preferably accounts for 5% by volume or more, and more preferably 10% by volume or more of the baked chocolate confection in order to accomplish the object of the present invention.

In this way, the smooth and melted texture of the inside can be tasted to the full.

For the volume of the soft portion, there may be also used an estimated value (approximate value) as calculated by the following measuring method.

On a cross section dividing the baked chocolate confection into two generally equal portions, sampling is performed from a plurality of positions and measurement is carried out for those samples to examine whether the soft portion described above is included or not, thereby calculating the rate.

Regarding the method for producing baked chocolate confection according to the present invention, in baking using an electric heater, it is particularly preferred to set the baking conditions to a temperature of 300 to 700° C., a baking time of 1 to 45 seconds, and a distance between the electric heater and the chocolate molds of 5 to 15 cm. When the baking is carried out under such conditions, there can be produced baked chocolate confection of which the surface has been sufficiently baked, has no scorches, and has been evenly baked.

EXAMPLES

COMPARATIVE EXAMPLES (1) Baking by Oven

Comparative Examples 1-4

There were blended 5 parts by mass of cocoa mass, 10 parts by mass of cocoa powder, 25 parts by mass of sugar, 10 parts by mass of lactose, 10 parts by mass of whole milk powder, 10 parts by mass of skimmed milk powder, 30 parts by mass of vegetable oil and fat, and 0.3 parts by mass of lecithin, these ingredients were mixed, subjected to refining so that the particle size became 25 μm, and then subjected to conching according to the conventional techniques to prepare chocolate dough (cocoa mass dough dough 1).

In addition, there were blended 50 parts by mass of sugar, 20 parts by mass of whole milk powder, 8 parts by mass of cocoa butter, 22 parts by mass of vegetable oil and fat, and 0.3 parts by mass of lecithin, these ingredients were mixed, subjected to refining so that the particle size became 25 μm, and then subjected to conching according to the conventional techniques to prepare chocolate dough (white dough 1).

Each of the chocolate dough was put into a mold (inner diameter of 20, depth of 10 mm), cooled, solidified, and then taken out from the mold and placed in an oven for baking at each temperature and for each period of time set forth in Table 1 to produce baked chocolate confections (Comparative Examples 1-4).

For the baked chocolate confection, 0.3 g of the central portion thereof was used as a sample and allowed to stand in a state of a generally spherical shape within a circle with a diameter of 15 mm on a plate (polycarbonate). Subsequently, the plate was stood upright at a temperature of 40° C. and allowed to stand for 60 minutes. The same procedures were carried out for the plurality of the samples.

In addition, for the baked chocolate confection, a sample of 0.3 g of the central portion thereof was prepared and the maximum particle size thereof was measured using DIGI-MATIC MICROMETER (trade name, manufactured by Mitutoyo Corporation).

Then, there were carried out sensory evaluation of texture and evaluation of a state of the baked surface for the baked chocolate confection produced by this method.

These results are shown in Table 1. In Table 1, the column "Maximum particle size" indicates the minimum value among the measured maximum particle size values for the respective samples obtained from the inside of baked chocolate confection of a certain comparative example (example).

(2) Baking by Schwank Burner

Comparative Examples 5-9

There were prepared the cocoa mass dough 1 described above and each of cocoa mass dough 2-4 that was prepared in the composition and by the method described below.

Cocoa mass dough 2: 40 parts by mass of sugar, 10 parts by mass of trehalose, 10 parts by mass of cocoa mass, 15 parts by mass of milk powder, and 25 parts by mass of vegetable oil and fat were mixed, and subjected to refining and conching according to the conventional techniques to prepare chocolate dough.

Cocoa mass dough 3: 31 parts by mass of sugar, 10 parts by mass of trehalose, 30 parts by mass of cocoa mass, 15 parts by mass of milk powder, 1.5 parts by mass of cocoa powder, 12.5 parts by mass of non-tempering type oil and fat C, and 0.5 parts by mass of lecithin were mixed, and subjected to refining and conching according to the conventional techniques to prepare chocolate dough.

Cocoa mass dough 4: 40 parts by mass of sugar, 10 parts by mass of trehalose, 10 parts by mass of cocoa mass, 15 parts by mass of milk powder, and 25 parts by mass of vegetable oil and fat, 0.2 parts by mass of lecithin, and 2 parts by mass of emulsifier (decaglycerol decastearic acid ester) were mixed, and subjected to refining and conching according to the conventional techniques to prepare chocolate dough. This dough was cooled to 25° C., charged into a pressurized mixer, mixed for 2 minutes under pressure of 3 atmospheres, and then returned to the normal pressure to give semifluid chocolate dough containing bubbles (aerated chocolate dough, specific gravity 0.4).

Each of the cocoa mass dough 1-4 was molded, and cooled and solidified at 10° C. for 30 minutes to give each chocolate. Subsequently, each resultant chocolate was placed in a Schwank burner and baked with direct fire of the Schwank heater at 800° C. for the period of time and at the distance between the Schwank burner and the chocolate set forth in Table 1. Then, through cooling, baked chocolate confection was obtained (Comparative Examples 5-9).

The baked chocolate confection was evaluated for the state of sticking to the plate and the state of deformation, the particle size, the texture and the state of baking by the methods described above.

The results are shown in Table 1.

EXAMPLES (1) Baking Using Electric Heater

Examples 1-16

Baking by an electric heater was carried out on a chocolate mold of the cocoa mass dough 1. That is, three sheath heaters, i.e., electric heater pipes, were horizontally arranged in a row, and the chocolate molds were baked by allowing the chocolate molds to pass below the electric heater in a particular period of time. At this time, there were set the temperature of the heater, the period of time taken for the chocolate mold to pass below the electric heater (baking time), and the distance between the electric heater and the chocolate mold to various conditions as set forth in Table 1, and the baking was carried out (Examples 1-16).

Then, for the baked chocolate confection produced, the state of sticking to the plate and the state of deformation, the particle size, the texture, and the state of baking were evaluated by the methods described above.

The results are shown in Table 1.

(2) Baking by Electric Heater and Hot Air

Examples 17-20

Baking by electric heater and hot air in combination was carried out on chocolate molds of the white dough 1. That is, three sheath heaters, i.e., electric heater pipes, were horizontally arranged in a row, hot air was delivered from a blower downward from above the electric heater, and the chocolate molds were baked by allowing the chocolate molds to pass below the electric heater. At this time, there were set the temperature of the heater, the baking time, and the distance between the electric heater and the chocolate mold passing below the electric heater to various conditions, and the baking was carried out (Examples 17-20). In addition, the wind velocity of the hot air was made 1 m/s at the time when reaching the surface of the chocolate confection. In this case, the hot air temperature was 150° C. in the vicinity of the sample.

For the baked chocolate confection produced by such a method, there were evaluated the state of sticking to the plate and the state of deformation, the particle size, the texture, and the state of baking, and the results are shown.

SUMMARY

As shown in Table 1, in methods of producing a baked chocolate confection, when the surface layer of the chocolate mold formed of chocolate dough was baked using electric heater, the inside of the baked chocolate confection included a portion having a maximum particle size of 40 μm or less and had such properties as sticking to a plate and deforming. Also in the sensory evaluation, the inside of such baked chocolate confection had smooth and melted texture. Particularly in the baked chocolate confection produced by baking under the conditions of the baking temperature of 300 to 700° C., the baking time of 1 to 45 seconds, and the distance between the electric heater and the chocolate mold of 5 to 15 cm, the surface had no scorches and was sufficiently evenly baked, and the inside had smooth and melted texture.

On the other hand, the inside of the baked chocolate confection baked using an oven or a Schwank burner (Comparative Examples) did not have a portion with a maximum particle size of 40 μm or less and either did not stick to a plate or did stick thereto but was not deformed. Also in the sensory evaluation, the inside of such baked chocolate confection did not have smooth and melted texture.

Thus, it has been found that it is necessary to bake a chocolate mold by an electric heater in order to obtain "the baked chocolate confection obtainable by baking the surface layer of a chocolate mold formed of chocolate dough and having a surface structure that does not transfer to fingers at 40° C., wherein the inside of the baked chocolate confection includes a soft portion of solids having a maximum particle size of 40 μm or less as measured by a micrometer at 40° C." according to the present invention.

TABLE 1

| | Dough | Presence of aeration | Heat source | Baking temperature | Baking time | Distance (cm) | Maximum particle size | Sticking to plate, deformation | Sensory evaluation (*1) | Other evaluation (*2) |
|---|---|---|---|---|---|---|---|---|---|---|
| Example 1 | Cocoa mass dough 1 | None | Electric | 300 | 25 sec | 5 | 30 μm | Deformed | ⊙ | |
| Example 2 | Cocoa mass dough 1 | None | Electric | 700 | 3 sec | 5 | 25 μm | Deformed | ⊙ | |
| Example 3 | Cocoa mass dough 1 | None | Electric | 300 | 45 sec | 10 | 35 μm | Deformed | ⊙ | |
| Example 4 | Cocoa mass dough 1 | None | Electric | 700 | 5 sec | 10 | 25 μm | Deformed | ⊙ | |
| Example 5 | Cocoa mass dough 1 | None | Electric | 700 | 12 sec | 15 | 40 μm | Deformed | ○ | |
| Example 8 | Cocoa mass dough 1 | None | Electric | 250 | 25 sec | 5 | 30 μm | Deformed | ⊙ | Insufficiently baked |
| Example 9 | Cocoa mass dough 1 | None | Electric | 750 | 3 sec | 5 | 30 μm | Deformed | ⊙ | Excessively baked |
| Example 10 | Cocoa mass dough 1 | None | Electric | 250 | 45 sec | 10 | 25 μm | Deformed | ⊙ | Insufficiently baked |
| Example 11 | Cocoa mass dough 1 | None | Electric | 800 | 2 sec | 10 | 25 μm | Deformed | ⊙ | Unevenly baked |
| Example 12 | Cocoa mass dough 1 | None | Electric | 300 | 22 sec | 4 | 30 μm | Deformed | ⊙ | Unevenly baked |
| Example 13 | Cocoa mass dough 1 | None | Electric | 300 | 25 sec | 4 | 35 μm | Deformed | ⊙ | Excessively baked |
| Example 14 | Cocoa mass dough 1 | None | Electric | 700 | 2 sec | 4 | 25 μm | Deformed | ⊙ | Unevenly baked |
| Example 15 | Cocoa mass dough 1 | None | Electric | 700 | 3 sec | 4 | 30 μm | Deformed | ⊙ | Excessively baked |
| Example 16 | Cocoa mass dough 1 | None | Electric | 700 | 12 sec | 16 | 40 μm | Deformed | ○ | Insufficiently baked |
| Example 17 | White dough 1 | None | Electric + hot air | 300 | 30 sec | 10 | 40 μm | Deformed | ○ | |
| Example 18 | White dough 1 | None | Electric + hot air | 700 | 1 sec | 10 | 30 μm | Deformed | ⊙ | |
| Example 19 | White dough 1 | None | Electric + hot air | 250 | 30 sec | 10 | 40 μm | Deformed | ○ | Insufficiently baked |
| Example 20 | White dough 1 | None | Electric + hot air | 800 | 0.5 sec | 10 | 25 μm | Deformed | ⊙ | Unevenly baked |
| Comparative Example 1 | Cocoa mass dough 1 | None | Oven | 180 | 5 min | Unsettable | 100< μm | Not sticking | X | Insufficiently baked |
| Comparative Example 2 | Cocoa mass dough 1 | None | Oven | 200 | 5 min | Unsettable | 100< μm | Not sticking | X | |
| Comparative Example 3 | Cocoa mass dough 1 | None | Oven | 300 | 60 sec | Unsettable | 50 μm | Not sticking | X | |

TABLE 1-continued

|  | Dough | Presence of aeration | Heat source | Baking temperature | Baking time | Distance (cm) | Maximum particle size | Sticking to plate, deformation | Sensory evaluation (*1) | Other evaluation (*2) |
|---|---|---|---|---|---|---|---|---|---|---|
| Comparative Example 4 | White dough 1 | None | Oven | 200 | 5 min | Unsettable | 100< μm | Not sticking | X | |
| Comparative Example 5 | Cocoa mass dough 1 | None | Schwank | 800 | 5 sec | 5 | 45 μm | Not sticking | X | |
| Comparative Example 6 | Cocoa mass dough 1 | None | Schwank | 800 | 15 sec | 15 | 50 μm | Not sticking | X | |
| Comparative Example 7 | Cocoa mass dough 2 | None | Schwank | 800 | 3 sec | 4 | 50 μm | Not sticking | X | |
| Comparative Example 8 | Cocoa mass dough 3 | None | Schwank | 800 | 3 sec | 4 | 45 μm | Not deformed | Δ | |
| Comparative Example 9 | Cocoa mass dough 4 | Aeration (specific gravity 0.4) | Schwank | 800 | 3 sec | 6 | 50 μm | Not sticking | X | |

(*1)
⊙ the inside has very smooth and melted texture.
○ the inside has smooth and melted texture.
Δ the inside has soft texture.
X the inside has dry and crumbling texture.
(*2)
Insufficiently baked: the surface does not transfer to the fingers at 40 degrees.
Unevenly baked: a state where unevenness due to baking is present on the surface.
Excessively baked: a state where a scorching is present on the surface.

The invention claimed is:

1. A baked chocolate confection, comprising:
a surface structure that does not transfer to fingers at 40° C.,
the surface structure having a thickness of 0.01 mm to 5 mm,
an inside of the baked chocolate confection including at least one soft portion of solids, and
a maximum particle size in the at least one soft portion being 40 μm or less as measured by a micrometer at 40° C.,
wherein the baked chocolate confection is made by baking a chocolate dough with an electric heater for 45 seconds or less, the chocolate dough comprising:
25% to 50% by mass of oil and fat including
oil and fat from cocoa mass, a powdered milk, and cocoa powder, and
cocoa butter substitute fat including vegetable oil and fat; and
75% to 50% by mass of a combination of
a saccharide,
non-oil and fat content of the powdered milk,
an emulsifier,
flavoring, and
cocoa solids selected from the group consisting of cocoa powder and cocoa solids contained within cocoa mass.

2. The baked chocolate confection according to claim 1, wherein when 0.3 g of a structure piece from the at least one soft portion is allowed to stand within a circle with a diameter of 15 mm on a plastic plate at 40° C. and then the plate is stood upright, the structure piece is deformed while sticking to the plate.

3. A baked chocolate confection, comprising:
a surface structure that does not transfer to fingers at 40° C.,
the surface structure having a thickness of 0.01 mm to 5 mm,
an inside of the baked chocolate confection including at least one soft portion of solids, and
a maximum particle size in the at least one soft portion being 40 μm or less as measured by a micrometer at 40° C.,
wherein the baked chocolate confection is made by baking a chocolate dough with an electric heater for 45 seconds or less, the chocolate dough comprising:
25% to 50% by mass of oil and fat including
oil and fat from a powdered milk,
cocoa butter,
cocoa butter substitute fat including vegetable oil and fat; and
75% to 50% by mass of a combination of
a saccharide,
non-oil and fat content of the powdered milk,
an emulsifier, and
flavoring.

4. A baked chocolate confection resulting from a mold of chocolate dough baked with an electric heater for 45 seconds or less,
wherein the chocolate dough includes:
25% to 50% by mass of oil and fat including
oil and fat from cocoa mass, a powdered milk, and cocoa powder, and
cocoa butter substitute fat including vegetable oil and fat; and
75% to 50% by mass of a combination of
a saccharide,
non-oil and fat content of the powdered milk,
an emulsifier,
flavoring, and
cocoa solids selected from the group consisting of cocoa powder and cocoa solids contained within cocoa mass, and
wherein after baking,
the baked chocolate confection has a surface structure that does not transfer to fingers at 40° C., the surface structure having a thickness of 0.01 mm to 5 mm,
an inside of the baked chocolate confection includes at least one soft portion, and
when 0.3 g of a structure piece from the at least one soft portion is allowed to stand within a circle with a diameter of 15 mm on a plastic plate at 40° C. and then the plate is stood upright, the structure piece is deformed while sticking to the plate.

5. The baked chocolate confection according to claim 1, wherein the volume of the at least one soft portion is 5% by volume or more and 99% by volume or less of the baked chocolate confection.

6. A method for producing a baked chocolate confection according to claim 1 wherein the chocolate dough is baked with an electric heater having a surface temperature from 250 to 800° C. for 0.5 to 45 seconds.

7. The method for producing a baked chocolate confection according to claim 6, wherein the surface temperature of the electric heater is from 300 to 700° C. and the baking time is from 1 to 45 seconds.

8. The method for producing a baked chocolate confection according to claim 6, further comprising baking the surface layer of the chocolate mold by blowing hot air onto the surface of the chocolate mold.

9. The method for producing a baked chocolate confection according to claim 8, wherein the electric heater includes a plurality of pipes arranged with a distance therebetween and delivers the hot air through between the pipes.

10. The method for producing a baked chocolate confection according to claim 8, wherein the hot air has a temperature from 150 to 600° C. and an air velocity of 5 m/s or less on reaching the surface of the chocolate confection.

11. The baked chocolate confection according to claim 1, wherein a particle size of solids contained in the chocolate dough prior to baking is from 12 to 30 μm.

12. The baked chocolate confection according to claim 3, wherein a particle size of solids contained in the chocolate dough prior to baking is from 12 to 30 μm.

13. The baked chocolate confection according to claim 4, wherein a particle size of solids contained in the chocolate dough prior to baking is from 12 to 30 μm.

* * * * *